(12) United States Patent
Kim et al.

(10) Patent No.: US 7,577,218 B2
(45) Date of Patent: Aug. 18, 2009

(54) SIGNAL ACQUISITION APPARATUS AND METHOD FOR REDUCING FALSE ALARM RATE

(75) Inventors: Yun-young Kim, Yongin-si (KR); Jae-hyun Koo, Seoul (KR); Yeon-gon Cho, Suwon-si (KR); Jae-ho Roh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 670 days.

(21) Appl. No.: 11/315,120

(22) Filed: Dec. 23, 2005

(65) Prior Publication Data
US 2006/0140314 A1 Jun. 29, 2006

(30) Foreign Application Priority Data
Dec. 27, 2004 (KR) ............ 10-2004-0113023

(51) Int. Cl.
*H04B 1/10* (2006.01)
(52) U.S. Cl. ............ 375/343; 375/346
(58) Field of Classification Search ........ 375/340, 375/343, 346; 342/93
See application file for complete search history.

(56) References Cited
U.S. PATENT DOCUMENTS 5,170,359 A * 12/1992 Sax et al. ............ 702/73
5,784,339 A * 7/1998 Woodsum et al. ............ 367/134
6,229,842 B1 * 5/2001 Schulist et al. ............ 375/148
6,373,858 B1 * 4/2002 Soleimani et al. ............ 370/476

FOREIGN PATENT DOCUMENTS
CN 1346191 A 4/2002

OTHER PUBLICATIONS

Chang-Joo Kim, Hyuck-Jae Lee, and Hwang-Soo Lee, Adaptive Acquisition of PN Sequences for DSSS Communications, IEEE Transactions on Communications, Aug. 31, 1998 pp. 993-994 vol. 46, No. 8.

* cited by examiner

*Primary Examiner*—David B Lugo
(74) *Attorney, Agent, or Firm*—Sughrue Mion, PLLC

(57) ABSTRACT

A signal acquisition apparatus and method for reducing a false alarm rate are disclosed. The apparatus includes a comparator for detecting a first peak by comparing a correlation value of a received signal with a first threshold and detecting second peaks in a sample interval of the detected first peak based on a second threshold which is different from the first threshold. Thus, a signal is acquired based on a number of the detected second peaks. Accordingly, the false alarm rate due to the noise can be reduced while the detection probability is maintained even at a high SNR.

31 Claims, 8 Drawing Sheets

SIGNAL ACQUISITION APPARATUS AND METHOD FOR REDUCING FALSE ALARM RATE

CROSS-REFERENCE TO RELATED APPLICATIONS

This application claims the benefit under 35 U.S.C. § 119(a) from Korean Patent Application No. 2004-113023 filed on Dec. 27, 2004 in the Korean Intellectual Property Office, the entire disclosure of which is incorporated herein by reference.

BACKGROUND OF THE INVENTION

1. Field of the Invention

Apparatuses and methods consistent with the present invention relate to a mobile communication system. More particularly, the present invention relates to a signal acquisition apparatus and method for reducing a false alarm rate when a receiver detects synchronization of received data.

2. Description of the Related Art

In a general mobile burst communication system, a receiving end should acquire code synchronization prior to the acquisition of received information. Typically, the acquisition of the code synchronization employs a matched filter or an adaptive correlator. At the end of the matched filter of the adaptive correlator, a detector is provided for determining the presence or absence of the synchronization.

The acquisition of the code synchronization is crucial to a spread spectrum receiver. The synchronization acquisition can be detected through an active scheme, a passive scheme, and a combination of the two schemes. The passive scheme utilizes a filter matched to the spreading code, that is, utilizes a matched filter. The output of the matched filter is input to a threshold detector which determines whether to synchronize. The selection of the threshold greatly affects the performance of the active and passive synchronization acquisitions.

A conventional spread spectrum communication system takes advantage of a PN code or a code modified somewhat from the PN code. For the synchronization acquisition of the PN code, an apparatus using an analog circuit or a digital circuit detects a time when a correlation value is maximum or exceeds a threshold by use of correlation characteristics of the PN code.

In case of a general burst transmission system, it is risky to determine a correlation peak as a maximum value of the output of the matched filter to acquire the synchronization of the received signal because a start point of the bursts are not known. Thus, after prescribing a proper threshold, the correlation peak is determined when the output of the matched filter exceeds the prescribed threshold.

The conventional synchronization acquisition method takes a correlation value between a PN code received during one cycle or a cycle in part of the PN code, and a PN code generated at the receiver. Accordingly, the correlation value is affected in proportion to an amount of errors occurring due to noise or interference over a channel. As a result, erroneous synchronization acquisition may be caused. In view of probability, a probability of the erroneous synchronization acquisition is not zero. An ideal correlation value differs from a substantial correlation value because of the occurrence of the error by the channel status. Hence, a determination may be made that no synchronization is acquired even when it is synchronized according to the threshold of the correlation value which determines the synchronization acquisition, which is called a missing probability. Conversely, the synchronization acquisition may be determined even when it is not substantially synchronized, which is called a false alarm probability. In this respect, the verification procedure of the synchronization circuit is required according to an applied system. That is, the error due to the channel conditions affects in proportion to the correlation value that estimates the synchronization acquisition, and therefore acts as a crucial requirement in the system design.

To respond this, several methods have been proposed to determine the correlation value for the effective synchronization acquisition. A method calculates intersections of the threshold during code periods, and increases or decreases the threshold so as to obtain a desired number of intersections. It is noted that this method requires several periods and is suitable only for a special case in the code acquisition.

Meanwhile, a variance of the noise is roughly calculated using linear finite impulse response (FIR) filters. The variance of the noise or the interference is predictable, but determination knowledge of the threshold is required with respect to the channel status. For example, a constant false alarm rate (CFAR) is determined using a Rayleigh scattering of the decision variable via an additive white Gaussian noise (AWGN) channel. At this time, a reference channel filter is required, which should be orthogonal to the intended channel. If the unbalance of the reference channel impulse response of the generated code does not match the impulse response of the spreading code, it is well adopted in the noise environment but may be problematic in a jamming environment such as CW jamming.

For example, such a problem occurs when a supplementary code pair orthogonal to the codes and a code pair are adopted. Typically, every method for acquiring a fixed false alarm probability demands prior knowledge of the channel status, such as noise variance, the number of other users in a code division multiple access (CDMA) system, and a jamming factor.

One of the conventional methods to determine the threshold, takes advantage of an incoherent matched filter code synchronization acquisition structure. The output signal of the matched filter is proportional to an autocorrelation function (ACF) of the spreading code. Sampling at the output of an envelope detector is conducted by at least chip rate. A comparator uses a threshold $T_h$ to determine whether the output is '0' or '1'. When the threshold intersects the correlation value at zero delay, its output is detected. In contrast, when the threshold intersects at other delays, the false alarm is detected. A rank filter orders output samples of N-ary matched filters in an ascending order, and obtains the threshold from N (window length) and a predefined location K. The false alarm rate can be acquired based on Equation 1.

$$P_{fa} = \frac{N - K + 1}{N} \quad \text{[Equation 1]}$$

Provided that the threshold is calculated from K=N/2, its result is at the middle of the sample set and $P_{fa}$ is about 0.5. The delay is a half of the sample set, that is, N/2 samples. A new threshold is given at the chip rate.

Specifically, a PN code for synchronization is input to the matched filter and compared bit by bit with a PN code for synchronization stored in the receiver. When the corresponding bits of the two codes are identical, '1' is output, and when the corresponding bits are different, '0' is output. Accordingly, when the two codes match in most bits, the greatest number of '1's is output and the output values of the matched filter are converted to an energy value X through the envelope detector. In other words, when the PN codes are identical and completely match with time, a very high correlation value is produced and thus a maximum energy value is generated. Otherwise, a relative small energy value is generated since a very low correlation value is produced.

Besides the passive scheme using the matched filter in the synchronization circuit as discussed above, the active scheme employs a cross correlator. The use of the cross correlator can speed up the detection but is subject to the complex implementation in comparison with the matched filter. However, the two schemes produce the same result.

As mentioned above, the energy value can determine whether the PN synchronization matches using a set threshold.

However, at this time, it may be miscalculated that the synchronization is performed even when there is no desired code. A parameter relating to the miscalculation probability is the false alarm probability. A threshold determination method has been under development to fix the false alarm probability and maximize a detection probability.

One of the threshold determination methods is a fixed threshold determination method. This method fixes the threshold to an extracted value of the energy value of the background noise received at the initial code synchronization, and determines whether it is code synchronized. However, the fixed threshold method causes various problems not only in the code synchronization acquisition for every change of the background noise of the wireless channel environment but also over a multipath channel. To be brief, this method shows poor adaptability to the change of the channel environment.

Another method averages N-ary output values of a received code signal that has passed through a matched filter or a correlator, and utilizes the average value as the threshold. This method shows the optimal performance in a homogeneous wireless channel environment, that is, when the background noise is constant independently from the magnitude. However, when the background noise changes, the code synchronization time period may be lengthened or the false alarm rate may increase with respect to the received code. In addition, since arbitrary N-ary windows contain the multipath signal in the multipath channel, the threshold is increased and the code synchronization time period is lengthened.

Still another method processes the received code signal at the matched filter or the correlator of the receiving end, orders N-ary output values, and uses a value having a certain magnitude as a code synchronization threshold. This method shows excellent performance in the multipath channel but lengthens the code synchronization acquisition time in the homogeneous channel environment as compared with the another method.

The relation between the threshold and the false alarm probability is provided below. As well known to one skilled in the art, in case that a high threshold is set to reduce the false alarm probability, the synchronization detection probability lowers. In contrast, in case that a low threshold is set to increase the synchronization detection probability, the high synchronization detection probability is obtained but the false alarm probability also increases.

Therefore, it is of great importance to maintain the false alarm probability below a preset value and maximize the synchronization detection probability.

FIG. 1 is a block diagram of a conventional signal acquisition apparatus having a constant false alarm probability. Referring to FIG. 1, the conventional signal acquisition apparatus includes a matched filter 100, a received power estimator 110, an absolute value calculator 120, a multiplier 130, and a comparator 140. A received analog signal passes through an analog-to-digital converter (not shown), and is input to the matched filter 100 and the received power estimator 110.

The matched filter 100 outputs the correlation value as explained earlier, and the output value of the matched filter 100 is fed to the absolute value calculator 120 to obtain its absolute value. As a result, a magnitude of the correlation value is output.

For instance, provided that the received digital signal is $r_i$, the output value of the matched filter 100 can be expressed as Equation 2.

$$\text{output of the matched filter} = \sum_{i=0}^{N-1} r_i c_{N-1}^* \quad \text{[Equation 2]}$$

Let the absolute value calculated from the output of the matched filter 100 be $C_k$, and then $C_k$ can be expressed as Equation 3.

$$C_k = \left| \sum_{i=0}^{N-1} r_i c_{N-1}^* \right|^2 \quad \text{[Equation 3]}$$

The resultant value Y in intervals from 0 to M−1 with the burst size M can be expressed as Equation 4.

$$Y = \sum_{k=0}^{M-1} C_k \quad \text{[Equation 4]}$$

The received power estimator 110 measures a power with respect to the received signal. The received power Z measured from the received signal $r_i$ can be expressed as Equation 5.

$$Z = \sum_{i=0}^{N-1} |r_i|^2 \quad \text{[Equation 5]}$$

As shown in Equation 5, the output value of the received power estimator 110 is multiplied with a constant T at the multiplier 130, and the resultant value is input to the comparator 140. The constant T is a scaling value to regulate to a target false alarm probability.

The comparator 140 compares the output value of the absolute value calculator 120 in Equation 4, with the product of the output of the received power estimator 110 in Equation 5 and the constant T. According to a result of the comparison, when the output value of the absolute value calculator 120 is greater than the output value of the multiplier 130, the synchronization acquisition is determined.

FIG. 2 and FIG. 3 are graphs showing the output value of the CFAR detector of FIG. 1.

FIG. 2 is a graph showing the output value of the conventional signal acquisition apparatus having the constant false alarm rate. Referring to FIG. 2, the magnitude 201 of the output of the matched filter 100 of FIG. 1 generates a first peak 203 by packets. Accordingly, the threshold 202 is modified based on the output of the received power estimator 110 to thus effectively detect the synchronization.

FIG. 3 is an enlarged graph of FIG. 2 with respect to one packet. In FIG. 3, as discussed early, second peaks are generated in vicinity of the first peak 203 due to the influence of the channel conditions such as noise and multipath. Also, other second peaks 301 and 302 are generated away from the first peak 203.

The second peaks around the first peak 203 mostly result from the multipath. It can be seen that the synchronization is detected at the first peak 203. Because of the second peaks 301 and 302 generated away from the first peak 203 due to the noise, the synchronization may be determined, that is, may be falsely alarmed based on the low threshold 202, though it is not actual synchronization point.

As discussed above, the increase of the threshold 202 reduces the false alarm rate but lowers the signal detection probability. Conversely, the decrease of the threshold 202 increases not only the signal detection probability but also the false alarm rate because of the second peaks 301 and 302, where the substantial synchronization is not conducted, generated away from the first peak 203.

If the threshold is determined using a function of a signal to noise ratio (SNR) of the received signal, optimal result can be attained but is infeasible in practice. Hence, the threshold is adaptively determined using the power of the received signal as in the CFAR detection, and then characteristics of the CFAR can be obtained with all SNR.

Generally, the false alarm far more affects the performance of the synchronization acquisition when the signal is present with the noise, rather than merely the noise is present. Since the detection probability is low as for the low SNR, the false alarm rate is less affected. As for the high SNR, the false alarm may be generated at a wrong location because the detection probability is almost 1. As a result, disadvantageously, the detection probability performance is degraded.

To mitigate the effects of the false alarm, verification procedure is conducted after the packet detection to double-dwell on the signal. This requires a double signal acquisition time. By doing this, the false alarm due to the noise can be reduced but the overall detection probability may fall when the detection probability in each interval is not 1.

As the packet error rate (PER) results from not only the bit error but also the false alarm in the packet detection, a new method is demanded to reduce the false alarm rate while the detection probability is maintained.

SUMMARY OF THE INVENTION

The present invention has been provided to address the above-mentioned and other problems and disadvantages occurring in the conventional arrangement, and an aspect of the present invention provides a signal acquisition apparatus and method for reducing a false alarm rate that determines whether a signal is detected or not when the generation of a second peak is detected in a certain interval away from a first peak which exceeds a threshold.

Another aspect of the present invention provides a signal acquisition apparatus and method for reducing a false alarm rate that determines whether a signal is detected or not when a first peak is generated exceeding a threshold and the generation of a second peak is detected by another threshold in a certain interval away from the first peak.

To achieve the above aspects and/or features of the present invention, a signal acquisition apparatus for reducing a false alarm rate includes a matched filter which calculates a correlation value of a received signal; an absolute value calculator which calculates an absolute value from an output value of the matched filter and outputs a magnitude of the correlation value; a received power estimator which measures a power of the received signal; a scale factor selector which selects a first scale factor to be applied to a first threshold in a first peak detection of the received signal, and selects a second scale factor which is different from the first scale factor, to be applied to a second threshold in a second peak detection after the first peak detection; a multiplier which multiplies an output value of the received power estimator by the scale factor selected by the scale factor selector; a comparator which compares an output value of the absolute value calculator with an output value of the multiplier; and a peak counter which counts in a sample interval a number of second peaks of which output value from the absolute value calculator exceeds the second threshold according to a comparison result of the comparator.

The signal acquisition apparatus may further include an analog-to-digital converter which converts a received analog signal to a digital signal.

The comparator may determine the first peak detection when the output value of the received power estimator exceeds the first threshold which is generated by the first scale factor selected by the scale factor selector. The comparator may change the scale factor of the scale factor selector to the second scale factor after the first peak detection.

The peak counter may make a final determination that a signal is detected in the sample interval when the number of the counted second peaks detected in the sample interval exceeds a preset reference value.

The peak counter may change the scale factor of the scale factor selector to the first scale factor and re-perform the first peak detection when the number of the counted second peaks detected in the sample interval does not exceed a preset reference value.

The second threshold may be below the first threshold. The second scale factor may be below the first scale factor.

The first scale factor may be set to satisfy a target false alarm rate. The second scale factor may be set so that an adaptive threshold is greater than an average power of a noise.

The sample interval may be determined based on a delay profile characteristic.

The signal acquisition apparatus may further include a moving average calculator which calculates a decision variable by taking a moving average by a predefined magnitude from the output value of the absolute value calculator. The predefined magnitude may be determined depending on a size of an energy section dispersed by a channel.

In accordance with the aspects of the present invention, a signal acquisition method for reducing a false alarm rate includes detecting a first peak by comparing a correlation value of a received signal with a first threshold; detecting second peaks in a sample interval of the detected first peak based on a second threshold which is different from the first threshold; and determining whether a signal is acquired based on a number of the detected second peaks.

The detecting of the first peak includes setting a scale factor for generating the first threshold as a first scale factor; calculating an absolute value of a correlation value which is output by matched filtering the received signal; measuring an intensity of the received signal; and determining the first peak detection when the absolute value of the correlation value is greater than the first threshold which is the product of the received signal and the first scale factor.

The signal acquisition method may further include calculating a decision variable by taking a moving average of a predefined magnitude from the absolute value of the correlation value after the absolute value is calculated. The predefined magnitude may be determined depending on a size of an energy section dispersed by a channel.

The first scale factor may be set to satisfy a target false alarm rate. The detecting of the first peak may be iterated with respect to a received signal burst.

The detecting of the second peaks includes setting a scale factor for generating the second threshold as a second scale factor which is different from the first scale factor; calculating an absolute value of the correlation value which is output by matched filtering the received signal with respect to each sample in the sample interval; measuring an intensity of the received signal; and determining the second peak detection when the absolute value of the correlation value is greater than a product of the received signal and the second scale factor.

The signal acquisition method may further include calculating a decision variable by taking a moving average of a predefined magnitude from the absolute value of the correlation value after the absolute value is calculated. The predefined magnitude may be determined depending on a size of an energy section dispersed by a channel.

The second scale factor may be set such that an adaptive threshold is greater than an average power of a noise. The second scale factor may be below the first scale factor.

The determining of whether the signal is acquired based on the number of the detected second peaks may include counting the number of the detected second peaks; and determining the signal acquisition when the number of the counted second peaks in the sample interval is greater than a preset reference value.

The signal acquisition may be re-performed when the number of the second peaks counted in the sample interval does not exceed the preset reference value.

The signal acquisition method may further include converting a received analog signal to a digital signal.

The first peak detection may be determined when the output value of the received power estimator exceeds the first threshold. The threshold may be changed from the first threshold to the second threshold after the first peak detection.

The first peak detection may be re-performed by changing to the first threshold when the number of the second peaks counted in the sample interval does not exceed the preset reference value.

The second threshold may be below the first threshold. The sample interval may be determined based on a delay profile characteristic.

The present invention adapts multiple-dwell and multiple-threshold to reduce the false alarm rate while the detection performance is maintained during the signal detection.

Typically, the false alarm due to the noise is randomly generated according to its characteristic. Thus, such a false alarm is presented discretely rather than successively. Meanwhile, consecutive correlation peak values are produced in a multipath channel environment according to a delay profile. The present invention takes advantage of these properties to detect a first peak exceeding a threshold and determines the signal detection when successive second peaks are generated within a certain range of the first peak. Otherwise, the first peak is considered as the peak due to the noise. A threshold for the second peak detection is different from the threshold for the first peak detection.

In case of the correlation peak exceeding the threshold, the presence of the signal is determined when there are peaks exceeding the threshold within a certain interval from the corresponding point by use of the multiple-dwell. Otherwise, a determination is made that the peak results from the noise and thus the false alarm rate can be reduced.

Even when the signal is existent, different thresholds are applied to the respective peaks because the successive correlation peaks are different from each other according to the delay profile. In specific, at the initial correlation peak, the first peak is detected based on the first threshold. The second peaks in the interval from the first peak are detected based on the second threshold which is below the first threshold, for the signal verification at the first peak.

BRIEF DESCRIPTION OF THE DRAWING FIGURES

These and/or other aspects and advantages of the invention will become apparent and more readily appreciated from the following description of exemplary embodiments, taken in conjunction with the accompanying drawing figures of which:

DETAILED DESCRIPTION OF THE EMBODIMENTS

Figure 1:
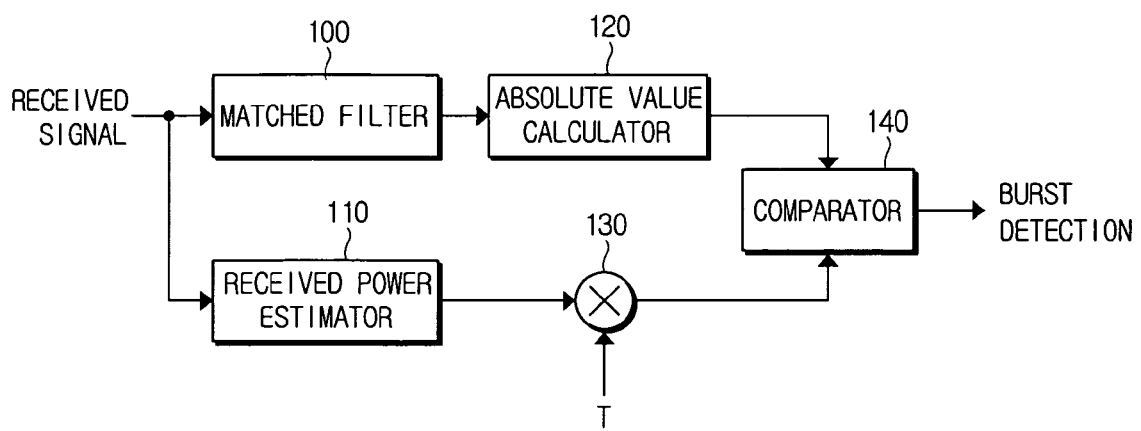
FIG. 1 is a block diagram of a conventional signal acquisition apparatus having a constant false alarm rate.
Figure 2:
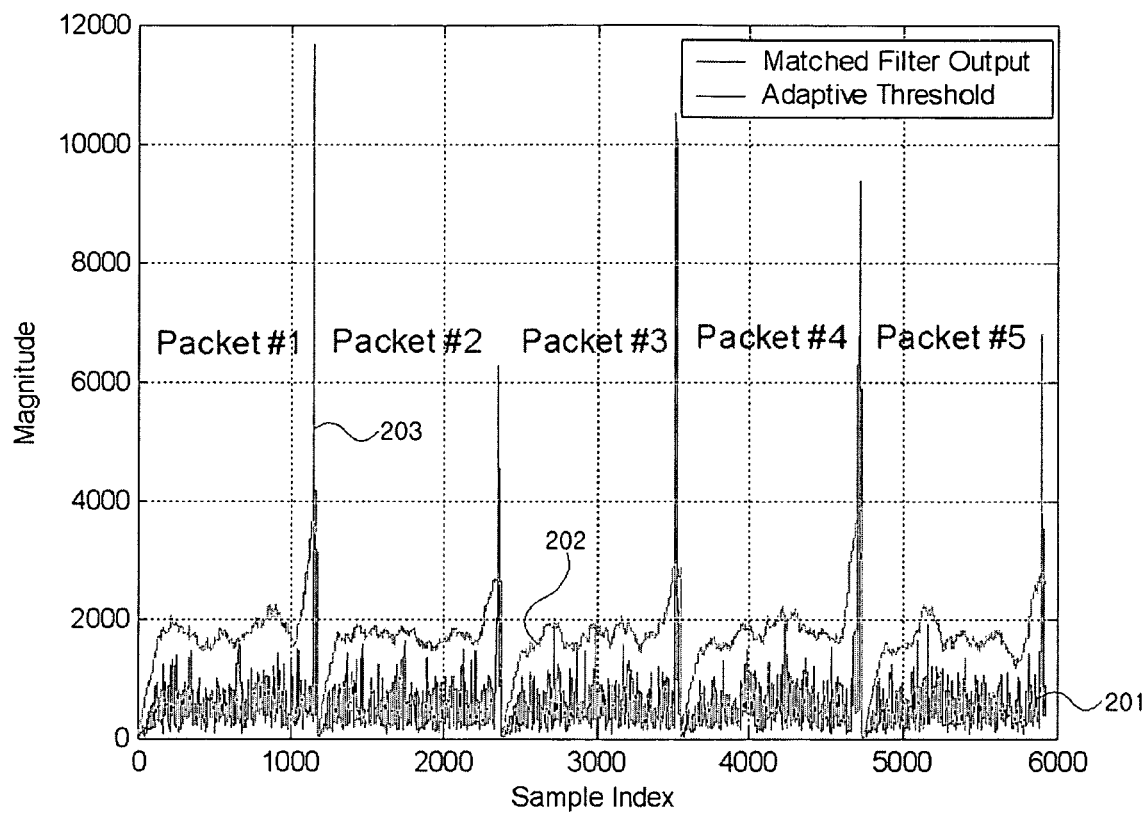
FIG. 2 is a graph showing an output value of the conventional signal acquisition apparatus.
Figure 3:
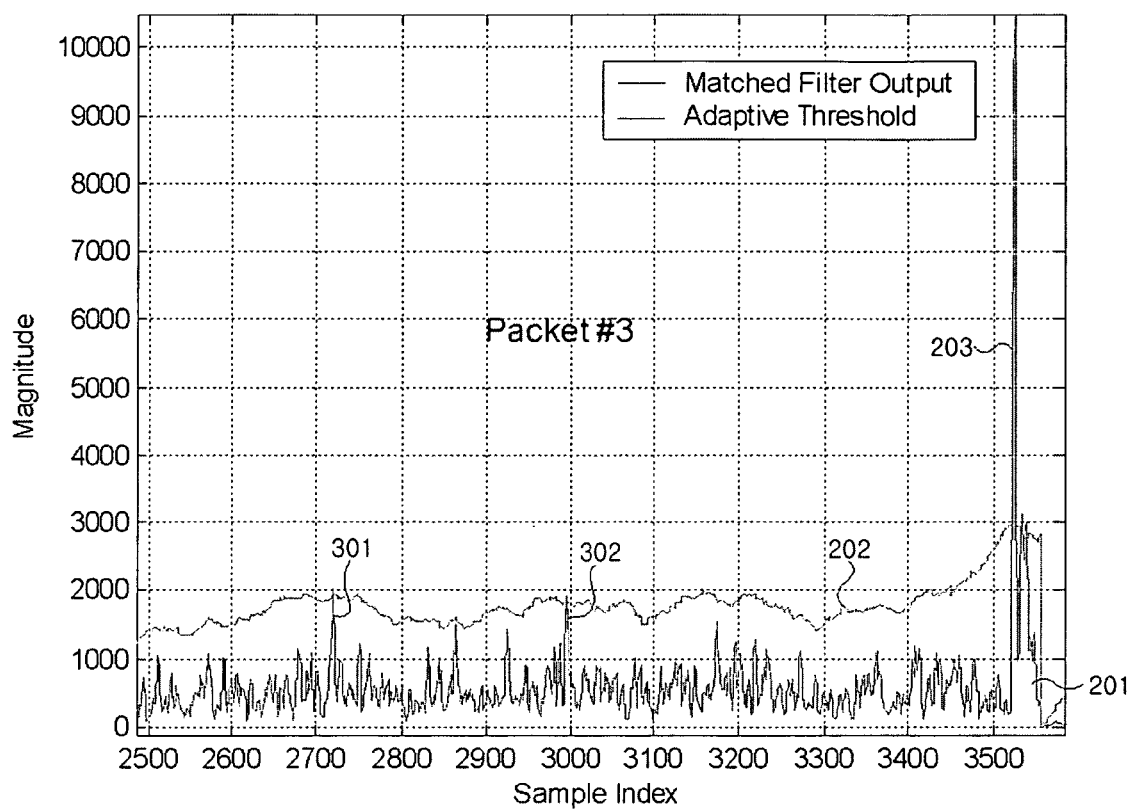
FIG. 3 is an enlarged graph of FIG. 2 with respect to one packet.

Certain exemplary embodiments of the present invention will now be described in greater detail with reference to the accompanying drawings.

In the following description, same drawing reference numerals are used for the same elements even in different drawings. The matters defined in the description, such as detailed construction and element descriptions, are provided to assist in a comprehensive understanding of the invention. Also, well-known functions or constructions are not described in detail since they would obscure the invention in unnecessary detail.

Figure 4:
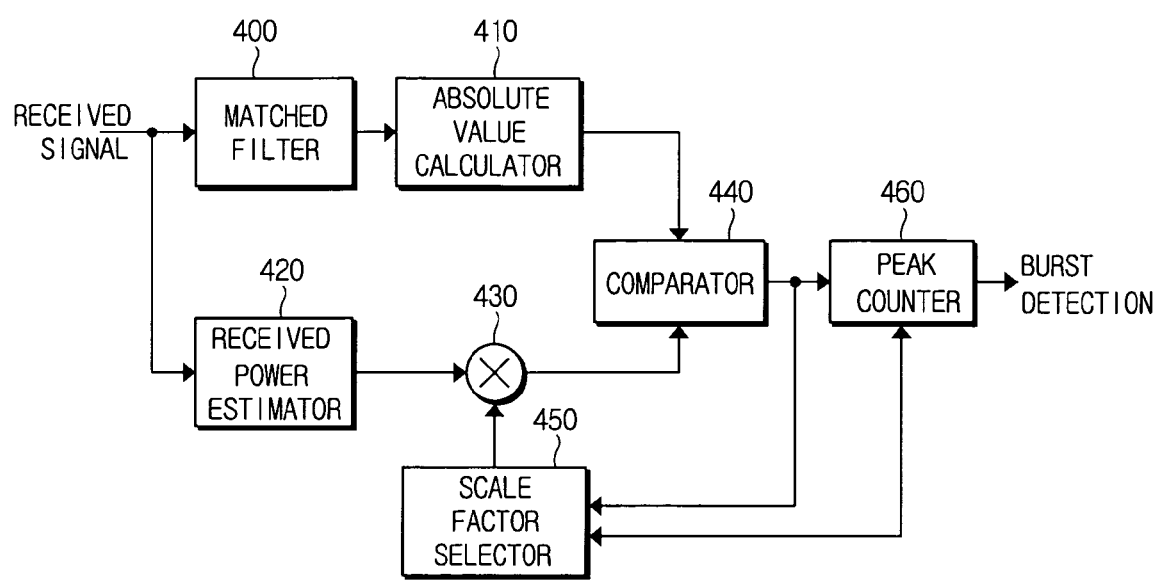
FIG. 4 is a block diagram of a signal acquisition apparatus having a constant false alarm rate according to one embodiment of the present invention.

FIG. 4 is a block diagram of a signal acquisition apparatus having a constant false alarm rate according to one embodiment of the present invention. Referring now to FIG. 4, the signal acquisition apparatus include a matched filter 400, an absolute value calculator 410, a received power estimator 420, a multiplier 430, a comparator 440, a scale factor selector 450, and a peak counter 460. A received analog signal passes through an analog-to-digital converter (not shown) and is fed to the matched filter 400 and the received power estimator 420, respectively. Note that a correlation detector may be employed in place of the matched filter 400.

The matched filter 400 outputs a correlation value of the received signal. The absolute value calculator 410 calculates an absolute value of the output value of the matched filter 400 and outputs a magnitude of the correlation value. It is noted that the output value of the matched filter 400 is a complex value, and the output value of the absolute value calculator 410 is a real value.

For example, provided that the received digital signal is $r_i$, the output value of the matched filter 400 is expressed as Equation 2 as explained above. In addition, let the absolute value of the output of the matched filter 400 be $C_k$, and then a resultant value Y in intervals from 0 to M−1 of a burst having a magnitude M is expressed as Equation 4.

The received power estimator 420 calculates a power of the received signal. The received power Z measured for the received signal $r_i$ is expressed as Equation 5 as explained early.

The output value of the received power estimator 420, as expressed in Equation 5, is multiplied with a constant T at the multiplier 430 and is fed to the comparator 440. The constant T is a scale factor to regulate to a target false alarm probability (rate). In one embodiment of the present invention, different scale factors are used so as to apply different thresholds in a first peak detection and a second peak detection. In specific, the scale factor selector 450 scales the output value of the received power estimator 420 with a first scale factor $T_1$ to be applied to a first threshold in the first peak detection with respect to the received signal. After the first peak detection, the scale factor selector 450 scales the output value with a second scale factor $T_2$ which is different from the first scale factor $T_1$, to be applied to a second threshold in the second peak detection. To be brief, the multiplier 430 multiplies the output value of the received power estimator 420 by the scale factor (e.g., $T_1$ or $T_2$) selected by the scale factor selector 450.

In the first peak detection, the comparator 440 compares the output value, as expressed in Equation 4, of the absolute value calculator 410 and the first threshold Th_1 obtained by multiplying the output value of the received power estimator 420 by the first scale factor $T_1$. When the output value of the absolute value calculator 410 exceeds the first threshold Th_1 according to a result of the comparison, a determination is made that the first peak is detected.

As explained above, a plurality of second peaks is generated within a certain interval of the first peak, it is determined that the second peaks result from the multipath, and the signal detection is completed. Otherwise, it is determined that the first peak results from the noise, and the signal detection is re-performed.

When the first peak is detected according to the comparison by the comparator 440, the comparator 440 notifies the scale factor selector 450 of the first peak detection. The scale factor selector 450 selects the scale factor input to the multiplier 430 as the second scale factor $T_2$ which is used to output the second threshold Th_2 according to the first peak detection of the comparator 440.

The second threshold Th_2 is to detect the second peaks in vicinity of the first peak. Hence, it is preferable to set the second threshold Th_2 to below the first threshold Th_1. Accordingly, the second scale factor $T_2$ is set to fall below the first scale factor $T_1$.

The first scale factor $T_1$ is set such that a false alarm probability satisfies a target value (e.g., $P_{fa}=10^{-3}$). The second scale factor $T_2$ is to maintain the detection probability $P_d$ and is set such that the adaptive threshold exceeds an average power of the noise. That is, the second scale factor $T_2$ is a scale factor for the average of the adaptive thresholds.

After detecting the first peak by the first scale factor $T_1$, the scale factor selector 450 provides the second scale factor $T_2$ to the multiplier 430.

Next, the comparator 440 determines how may second peaks are detected in a predefined sample interval $N_T$ at the detection location of the first peak. In detail, the comparator 440 counts how many times correlation peaks above the second threshold Th_2 by the second scale factor $T_2$ are generated in the sample interval $N_T$. The sample interval $N_T$ can be properly set based on the delay profile characteristic of the received signal.

The comparator 440 compares the output value of the received power estimator 420 and the second threshold Th_2 which is scaled by the second scale factor $T_2$, with respect to each sample in the sample interval $N_T$. When the output value of the absolute value calculator 410 exceeds the second threshold Th_2 at a corresponding sample according to a result of the comparison, this implies the generation of the second peak and the comparator 440 notifies the peak counter 460 of the comparison result.

The peak counter 460 counts the second peaks detected in the corresponding sample interval. In case that the number of the second peaks C in the corresponding sample interval exceeds a predefined number (e.g. from 3 to 5) $C_0$, a final determination is made that the signal is detected in the sample interval, that is, at the first peak.

The signal acquisition apparatus has been illustrated in detail. Hereafter, a signal acquisition method is elucidated in reference to FIG. 5.

Figure 5:
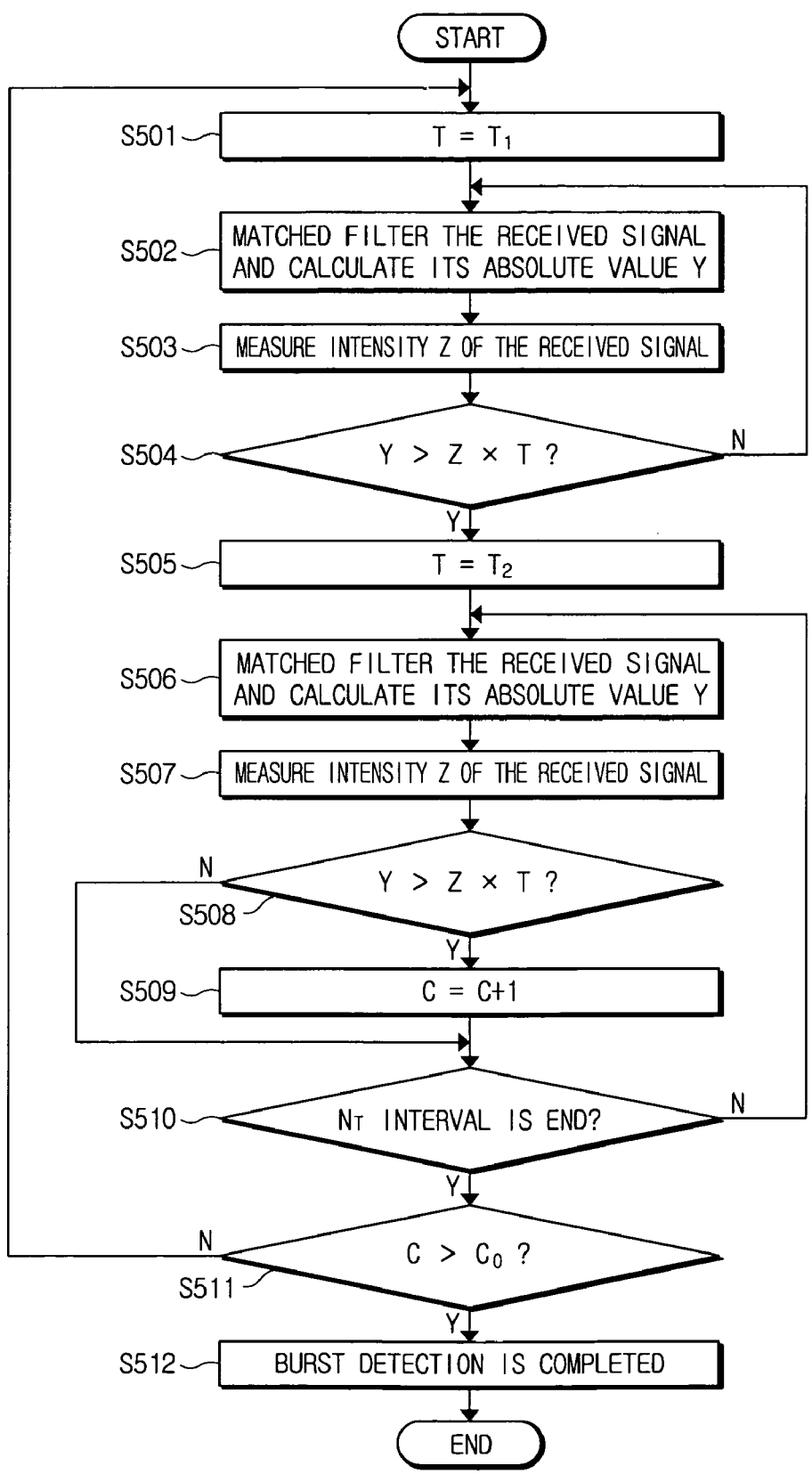
FIG. 5 is a flowchart outlining a signal acquisition method according to one embodiment of the present invention.

FIG. 5 is a flowchart outlining the signal acquisition method according to one embodiment of the present invention. Referring to FIG. 5, the signal acquisition method consists of first peak detection operations S501 through S504 by the first threshold Th_1, second peak detection operations S505 through S508 by the second threshold Th_2 in the sample interval $N_T$ of the detected first peak, and signal acquisition determination operations S509 through S512 based on the number of the second peaks.

For the first peak detection by the first threshold Th_1, a scale factor T for generating the first threshold Th_1 is set to the first scale factor $T_1$ (S501). The received signal is matched filtered, and an absolute value Y of the correlation value, which is output from the filtering, is calculated (S502). An intensity of the received signal Z is measured (S503).

When the absolute value Y of the correlation value is greater than the product of the received signal Z and the scale factor T (i.e., the first scale factor $T_1$), that is, than the first threshold Th_1 (S504), the detection of the first peak is determined. At this time, it is preferred that the detection of the first peak is continued for the received signal bursts.

After detecting the first peak, the second peak detection by the second threshold Th_2 is conducted in the sample interval $N_T$ of the detected first peak. For the second peak detection by the second threshold Th_2, a scale factor T for generating the second threshold Th_2 is set to the second scale factor $T_2$ (S505). Next, the second peak is detected by the second threshold Th_2 in a predefined sample interval $N_T$ of the first peak.

The received signal is matched filtered for each sample in the sample interval $N_T$, and an absolute value Y of its resultant correlation value is calculated (S506). The intensity Z of the received signal is measured (S507).

When the absolute value Y of the correlation value is greater than the product of the received signal Z and the scale factor T (i.e., the second scale factor $T_2$), that is, than the second threshold Th_2 (S508), the detection of the second peak is determined. The second peak detection is conducted in the sample interval $N_T$ as described above (S510).

Upon detecting the second peaks, the number of the detected second peaks is counted (S509). After detecting the second peaks in the sample interval $N_T$, when the number of the second peaks C counted in the sample interval $N_T$ is greater than the reference value $C_0$ (S511), the signal acquisition is determined since the second peaks are existent as the delay profile values around the first peak. Next, the burst detection is ended (S512).

In contrast, after detecting the second peaks in the sample interval $N_T$, when the number of the counted second peaks C is not greater than the reference value $C_0$ (S511), the first peak is regarded as the peak due to the noise and the signal acquisition operations are recommenced.

The second scale factor $T_2$ for the second peak detection is relatively smaller than the first scale factor $T_1$. The second scale factor $T_2$ is to prevent the miss probability by increasing the detection probability at the second peaks when the signal is lost.

The signal acquisition apparatus and method having the constant false alarm probability have been described in detail according to one embodiment of the present invention. In the following, the performance of the present invention is compared with the related art in reference to FIG. 6.

Figure 6:
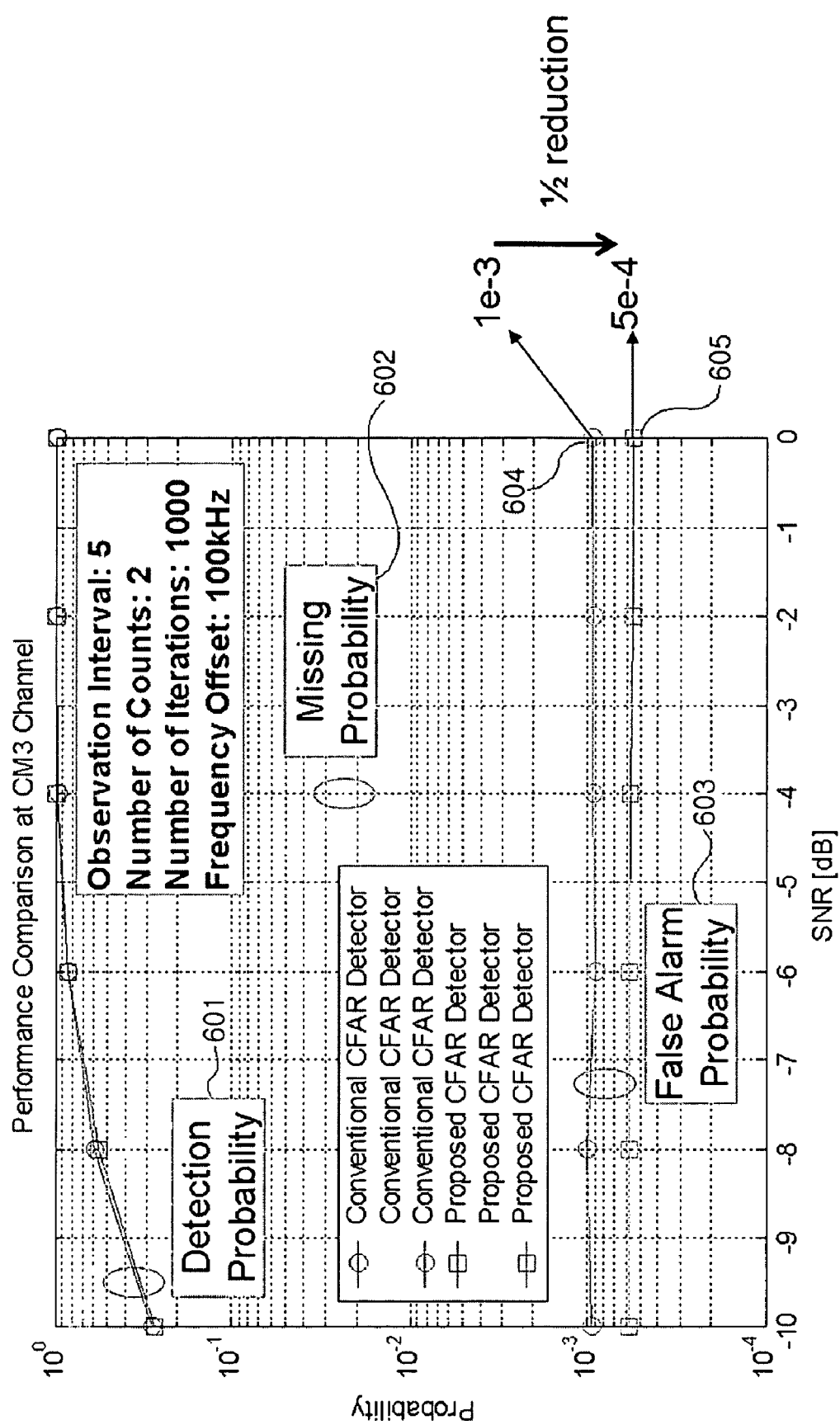
FIG. 6 is a graph showing the performance of the signal acquisition apparatus according to one embodiment of the present invention in comparison with the conventional apparatus.

FIG. 6 is a graph showing the performance of the signal acquisition apparatus according to one embodiment of the present invention in comparison with the conventional apparatus. For simulation conditions for the performance comparison, the observation interval is set to 5, the number of peak counts is set to 2, the number of iterations is set to 1,000, and the frequency offset is set to 1000 kHz.

As shown in FIG. 6, the signal acquisition method according to one embodiment of the present invention does not show a great difference from the related art in view of the detection probability 601 and the detection failure probability, that is, the missing probability 602.

Notably, the signal acquisition method according to one embodiment of the present invention drastically reduces the false alarm probability 603 while the detection probability 601 is maintained as in the related art. As can be seen in the graph, the present invention reduces the false alarm probability 603 by half from 1 e-3 to 5e-4.

<Another Embodiment of the Present Invention—Moving Average Applied>

Another embodiment of the present invention adapts the moving average to improve the performance.

As aforementioned, the signal acquisition apparatus for the packet detection should be implemented prior to other apparatuses in a burst packet transmission system, and is the most significant part in determining a frame error rate of the system. For example, as the ultra wide band (UWB) multiband OFDM Alliance (MBOA) sets a link success rate to 0.99, a packet detector is demanded to meet this requirement in any environment. That is, the signal acquisition apparatus should be implemented prior to other receiver algorithms, with a simplified construction and the improved performance since the packet acquisition is conducted only once for each packet in most cases.

As the energy of the signal is dispersed with time because of the delay profile by the multipath, there is no great difference between a mean peak and its adjacent peaks even when the receiver performs the cross correlation, and the packet detection is complicated in a wireless environment with a relatively low SNR. Thus, the construction needs to be simplified to detect the signal necessarily in a specific interval, rather than applying to a next signal after the packet detection similarly to other algorithms.

A conventional CFAR detector, which is designed for the signal detection in a radar system or a CDMA system, detects accurate timing of the signal. Such a conventional CFAR detector is not suitable to a system, such as orthogonal frequency division multiplexing (OFDM) system, where the timing is not a critical concern.

According to embodiments of the present invention, the signal acquisition apparatus can reduce the effects of the multipath channel by integrating the correlation output value during the energy section spread by the channel. Since the timing is not so critical in the OFDM system, unlike the CDMA system, the performance is not considerably affected even though the correlation output is moving averaged. The signal acquisition apparatus according to another embodiment of the present invention can increase the detection probability by gathering the energy dispersed due to the channel, as compared with the conventional detector.

Figure 7:
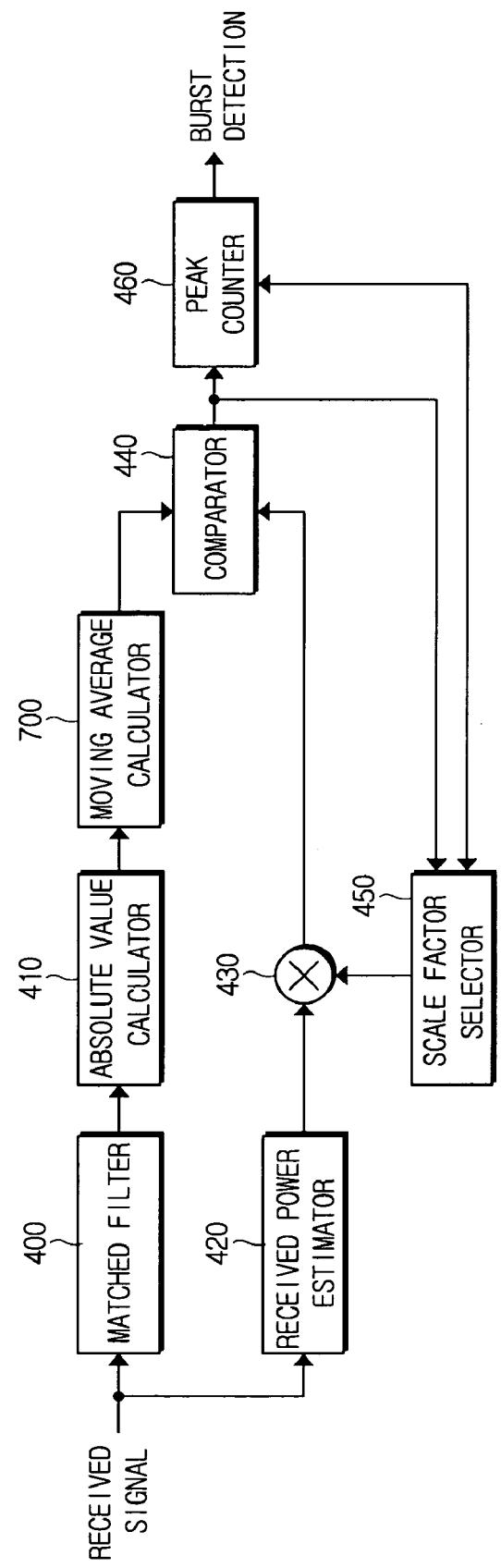
FIG. 7 is a block diagram of a signal acquisition apparatus having a constant false alarm rate and using a moving average according to another embodiment of the present invention.

FIG. 7 is a block diagram of the signal acquisition apparatus having a constant false alarm probability with the moving average applied according to another embodiment of the present invention. Referring to FIG. 7, the signal acquisition apparatus includes a matched filter 400, an absolute value calculator 410, a received power estimator 420, a multiplier 430, a comparator 440, a scale factor selector 450, a peak counter 460, and a moving average calculator 700. Notably, the signal acquisition apparatus according to this embodiment of the present invention is realized by including the moving average calculator 700 which applies the moving average to the output value of the absolute value calculator 410 of FIG. 4.

The received signal is a sequence that passed through noise or multipath channel, in a length N. The received signal is know to the receiver. The matched filter 400 cross-correlates the received signal using a complex conjugate of a reference signal $c_i$, which is known to the receiver. Next, an absolute value of the correlation value is squared. As a result, the output value of the absolute value calculator 410 is expressed as Equation 3 as described earlier.

Next, the moving average calculator 700 takes a moving average of burst size M and outputs a decision variable Y.

The comparator 440 uses the first threshold Th_1 or the second threshold Th_2 to be compared with the decision variable Y. As the subsequent operation of the comparator 440 is the same as explained in relation with FIG. 4, the description thereof will be omitted for brevity.

Rather than the output value of the absolute value calculator 410, the integrated value of the cross correlation output from the absolute value calculator 410 is used to compute the decision variable Y for use at the comparator 440. Therefore, the detection probability can be enhanced under the same conditions based on the OFDM, as compared with the conventional burst detector. Additionally, it is applicable in the multipath channel with a low SNR.

Table 1 shows the performance of the conventional CFAR detector without the moving average, and Table 2 shows the performance of the CFAR detector with the moving average according to another embodiment of the present invention.

TABLE 1

| | False alarm rate | | | | | | |
|---|---|---|---|---|---|---|---|
| SNR | 1e−2 | 5e−3 | 1e−3 | 5e−4 | 1e−4 | 5e−5 | 1e−5 |
| −10 db | 8.13e−1 | 7.35e−1 | 6.04e−1 | 5.07e−1 | 2.72e−1 | 2.07e−1 | 1.00e−1 |
| − 5 db | 1.00e+0 | 9.99e−1 | 9.98e−1 | 9.95e−1 | 9.72e−1 | 9.52e−1 | 8.39e−1 |
| 0 db | 1.00e+0 | 1.00e+0 | 1.00e+0 | 1.00e+0 | 1.00e+0 | 1.00e+0 | 1.00e+0 |

TABLE 2

| | False alarm rate | | | | | | |
|---|---|---|---|---|---|---|---|
| SNR | 1e−2 | 5e−3 | 1e−3 | 5e−4 | 1e−4 | 5e−5 | 1e−5 |
| −10 db | 9.45e−1 | 8.74e−1 | 7.47e−1 | 6.28e−1 | 4.52e−1 | 3.93e−1 | 2.40e−1 |
| − 5 db | 1.00e+0 | 1.00e+0 | 1.00e+0 | 1.00e+0 | 1.00e+0 | 1.00e+0 | 9.99e−1 |
| 0 db | 1.00e+0 | 1.00e+0 | 1.00e+0 | 1.00e+0 | 1.00e+0 | 1.00e+0 | 1.00e+0 |

As can be seen in Table 2, the reference false alarm rate (99%) is satisfied in more cases than Table 1.

Figure 8:
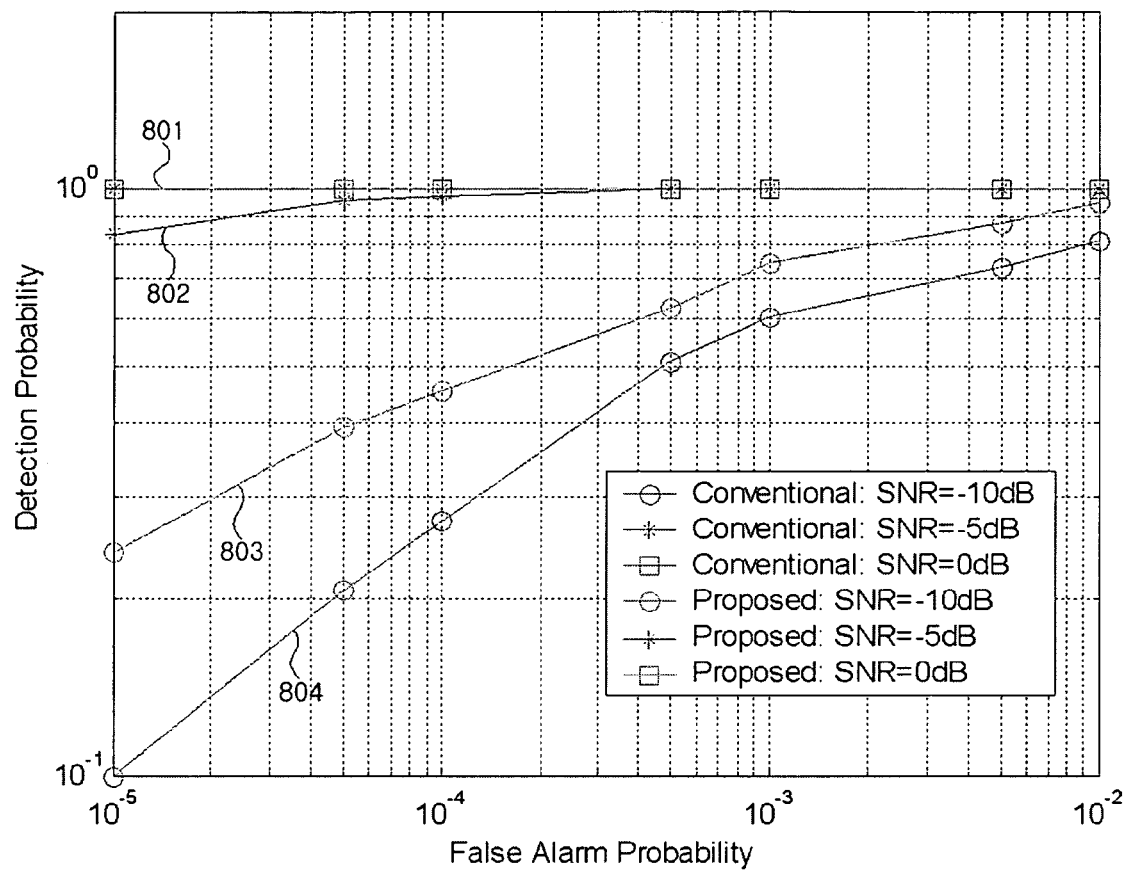
FIG. 8 is a graph showing the performance of the signal acquisition apparatus according to another embodiment of the present invention in comparison with the conventional apparatus.

FIG. 8 is a graph showing the performance according to another embodiment of the present invention in comparison with the conventional apparatus. As shown in FIG. 8, at all SNRs, the detection probabilities 801 and 803 of the detector according to this embodiment of the present invention are above the detection probabilities 802 and 804 of the conventional CFAR detector.

As set forth above, the false alarm rate due to the noise can be reduced by applying different thresholds to successive correlation peaks. Accordingly, the detection capability can be maintained even at the high SNR. The synchronization acquisition time can be shortened by conducting the packet detection and the verification.

In another embodiment of the present invention, the compared value of the comparator is used as the integrated value of the cross correlation. Therefore, the detection probability can be improved under the same conditions in the OFDM system in comparison with the conventional burst detector, and the present invention is adaptable in the multipath channel even with the low SNR.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A signal acquisition apparatus for reducing a false alarm rate, comprising:

a matched filter which calculates a correlation value of a received signal;

an absolute value calculator which calculates an absolute value from an output value of the matched filter and outputs a magnitude of the correlation value;

a received power estimator which measures a power of the received signal;

a scale factor selector which selects a first scale factor to be applied to a first threshold in a first peak detection of the received signal, and selects a second scale factor which is different from the first scale factor, to be applied to a second threshold in a second peak detection after the first peak detection;

a multiplier which multiplies an output value of the received power estimator by a scale factor selected by the scale factor selector;

a comparator which compares an output value of the absolute value calculator with an output value of the multiplier; and a peak counter which counts in a sample interval a number of second peaks of which output value from the absolute value calculator exceeds the second threshold according to a comparison result of the comparator.

2. The signal acquisition apparatus of claim 1, further comprising:

an analog-to-digital converter which converts a received analog signal to a digital signal.

3. The signal acquisition apparatus of claim 1, wherein the comparator determines the first peak detection when the output value of the absolute value calculator exceeds the first threshold which is generated by the first scale factor selected by the scale factor selector.

4. The signal acquisition apparatus of claim 3, wherein the comparator changes the scale factor of the scale factor selector to the second scale factor after the first peak detection.

5. The signal acquisition apparatus of claim 1, wherein the peak counter makes a final determination that a signal is detected in the sample interval when the number of the counted second peaks detected in the sample interval exceeds a preset reference value.

6. The signal acquisition apparatus of claim 1, wherein the peak counter changes the scale factor of the scale factor selector to the first scale factor and re-performs the first peak detection when the number of the counted second peaks detected in the sample interval does not exceed a preset reference value.

7. The signal acquisition apparatus of claim 1, wherein the second threshold is below the first threshold.

8. The signal acquisition apparatus of claim 7, wherein the second scale factor is below the first scale factor.

9. The signal acquisition apparatus of claim 1, wherein the first scale factor is set to satisfy a target false alarm rate.

10. The signal acquisition apparatus of claim 1, wherein the second scale factor is set so that an adaptive threshold is greater than an average power of a noise.

11. The signal acquisition apparatus of claim 1, wherein the sample interval is determined based on a delay profile characteristic.

12. The signal acquisition apparatus of claim 1, further comprising:
a moving average calculator which generates an output value by taking a moving average of a predefined magnitude from the output value of the absolute value calculator,
wherein said comparator compares the output of the moving average calculator with an output value of the multiplier and the peak counter counts in a sample interval a number of second peaks of which output value from the moving average calculator exceeds the second threshold according to a comparison of the comparator.

13. The signal acquisition apparatus of claim 12, wherein the predefined magnitude is determined depending on a size of an energy section dispersed by a channel.

14. A signal acquisition method for reducing a false alarm rate, comprising:
detecting, by a comparator, a first peak by comparing a correlation value of a received signal with a first threshold;
detecting, by the comparator, second peaks in a sample interval of the detected first peak based on a second threshold which is different from the first threshold; and
determining, by a peak counter, whether a signal is acquired based on a number of the detected second peaks,
wherein the detecting of the first peak comprises:
setting, by a scale factor selector, a scale factor for generating the first threshold as a first scale factor;
calculating, by an absolute value calculator, an absolute value of a correlation value which is output by matched filtering the received signal;
measuring, by a received power estimator, an intensity of the received signal; and
determining, by the comparator, the first peak detection when the absolute value of the correlation value is greater than the first threshold which is the product of the received signal and the first scale factor.

15. The signal acquisition method of claim 14, further comprising:
calculating a decision variable by taking a moving average of a predefined magnitude from the absolute value of the correlation value after the absolute value is calculated,
wherein the first peak detection is determined when the decision variable is greater than the first threshold which is the product of the received signal and the first scale factor.

16. The signal acquisition method of claim 15, wherein the predefined magnitude is determined depending on a size of an energy section dispersed by a channel.

17. The signal acquisition method of claim 14, wherein the first scale factor is set to satisfy a target false alarm rate.

18. The signal acquisition method of claim 14, wherein the detecting of the first peak is iterated with respect to a received signal burst.

19. The signal acquisition method of claim 14, wherein the detecting of the second peaks comprises:
setting a scale factor for generating the second threshold as a second scale factor which is different from the first scale factor;
calculating an absolute value of the correlation value which is output by matched filtering the received signal with respect to each sample in the sample interval;
measuring an intensity of the received signal; and
determining the second peak detection when the absolute value of the correlation value is greater than a product of the received signal and the second scale factor.

20. The signal acquisition method of claim 19, further comprising:
calculating a decision variable by taking a moving average of a predefined magnitude from the absolute value of the correlation value after the absolute value is calculated.

21. The signal acquisition method of claim 20, wherein the predefined magnitude is determined depending on a size of an energy section dispersed by a channel.

22. The signal acquisition method of claim 19, wherein the second scale factor is set such that an adaptive threshold is greater than an average power of a noise.

23. The signal acquisition method of claim 19, wherein the second scale factor is smaller than the first scale factor.

24. The signal acquisition method of claim 14, wherein the determining of whether the signal is acquired based on the number of the detected second peaks comprises:
counting the number of the detected second peaks; and
determining the signal acquisition when the number of the counted second peaks in the sample interval is greater than a preset reference value.

25. The signal acquisition method of claim 24, wherein the signal acquisition is re-performed when the number of the second peaks counted in the sample interval does not exceed the preset reference value.

26. The signal acquisition method of claim 14, further comprising:
converting a received analog signal to a digital signal.

27. The signal acquisition method of claim 14, wherein the first peak detection is determined when an output value of a received power estimator exceeds the first threshold.

28. The signal acquisition method of claim 14, wherein a threshold is changed from the first threshold to the second threshold after the first peak detection.

29. The signal acquisition method of claim 14, wherein the first peak detection is re-performed by changing to the first threshold when the number of the second peaks counted in the sample interval does not exceed the preset reference value.

30. The signal acquisition method of claim 14, wherein the second threshold is smaller than the first threshold.

31. The signal acquisition method of claim 14, wherein the sample interval is determined based on a delay profile characteristic.

* * * * *